July 13, 1926.

E. P. WEBSTER 1,592,793

MACHINE FOR PACKING BISCUITS

Original Filed June 29, 1922   14 Sheets-Sheet 1

INVENTOR
E. P. Webster
BY
E. W. Anderson
ATTORNEY

July 13, 1926.  
E. P. WEBSTER  
1,592,793  
MACHINE FOR PACKING BISCUITS  
Original Filed June 29, 1922   14 Sheets-Sheet 4

INVENTOR  
E. P. Webster.  
BY E. D. Anderson  
ATTORNEYS

July 13, 1926.  1,592,793
E. P. WEBSTER
MACHINE FOR PACKING BISCUITS
Original Filed June 29, 1922  14 Sheets-Sheet 8

INVENTOR
E. P. Webster
BY
S. D. Anderson
ATTORNEY

July 13, 1926.  
E. P. WEBSTER  
MACHINE FOR PACKING BISCUITS  
Original Filed June 29, 1922   14 Sheets-Sheet 12

1,592,793

INVENTOR  
BY E. P. Webster  
E. D. Anderson  
ATTORNEYS

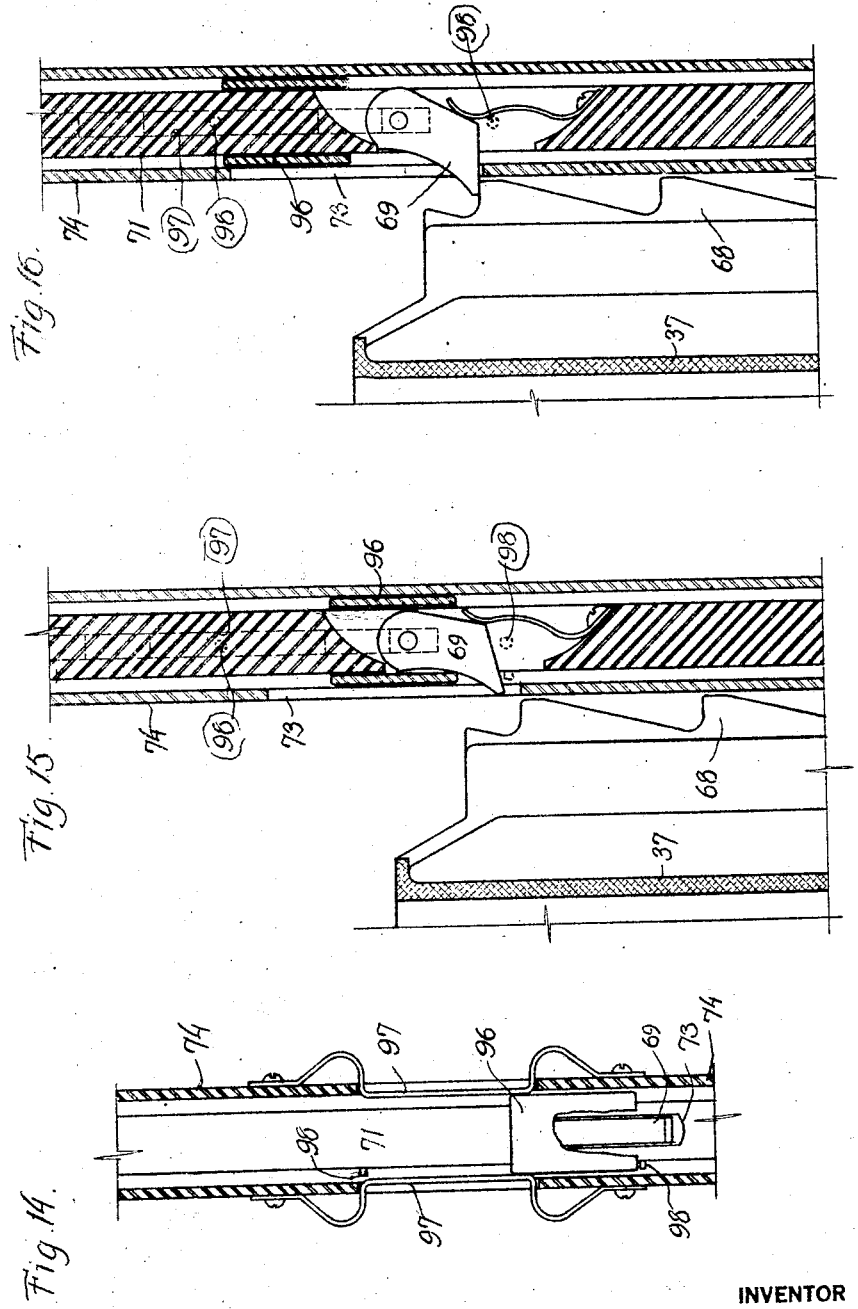

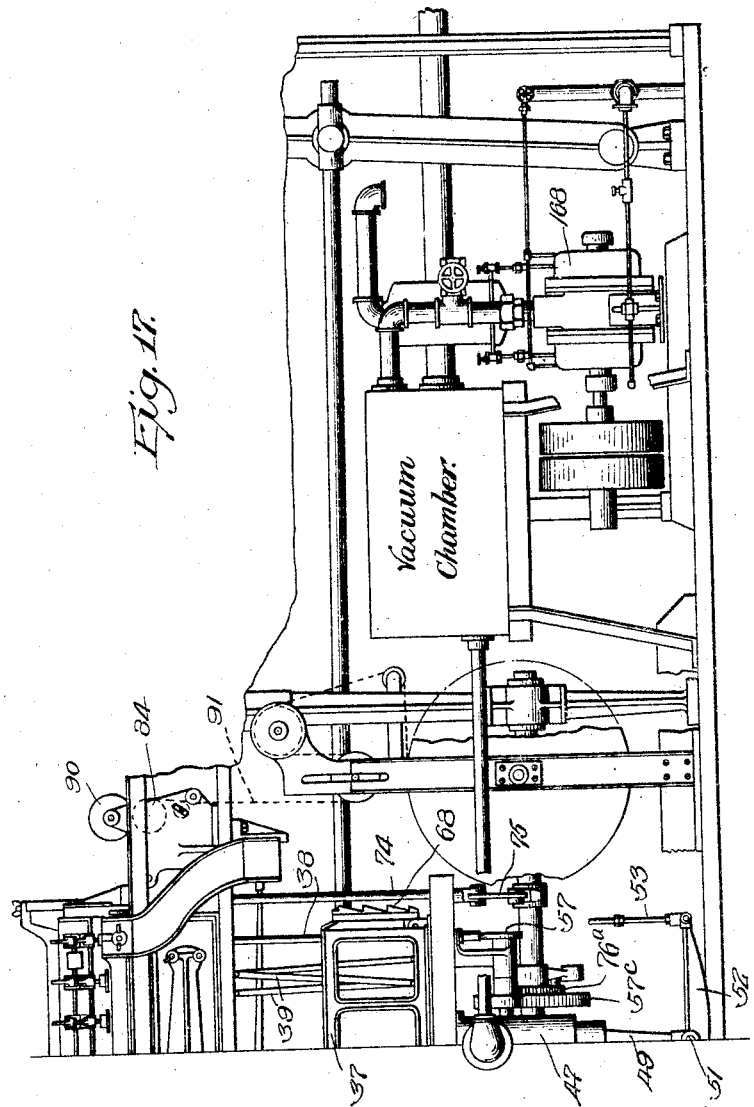

Patented July 13, 1926.

1,592,793

UNITED STATES PATENT OFFICE.

KARL P. WEBSTER, OF NIAGARA FALLS, NEW YORK, ASSIGNOR TO THE SHREDDED WHEAT COMPANY, OF NIAGARA FALLS, NEW YORK, A CORPORATION OF NEW YORK.

MACHINE FOR PACKING BISCUITS.

Application filed June 29, 1922, Serial No. 571,824. Renewed May 11, 1926.

This invention relates to machines for packing food products in receptacles such as cartons, and has to do more particularly with a machine by which food products of a delicate structure, such as shredded wheat biscuits, can be packed into cartons rapidly and without damage. An adaptation of the invention for packing such biscuits in cartons, each holding a dozen biscuits, will be described, but it is to be understood that the utility of the invention is not limited to the handling of this particular product, nor to packing in cartons of any particular size.

The machine of the present invention is constructed and arranged to pack the biscuits into cartons in horizontal groups or layers of three biscuits each, so that the cartons which are fed successively by suitable mechanism may be packed at a relatively rapid rate. At each operation of the machine a group of biscuits is fed to the carton to form a horizontal layer therein. As each carton has a considerable depth, it is not permissible to drop the fragile biscuits into position, but each layer must be carefully positioned in the carton. Accordingly, the biscuits are deposited in groups on a receiving surface or platform which enters each carton from beneath. This platform lies flush with the top of the carton to receive the first layer of biscuits and is then moved downwardly a step corresponding to the thickness of the layer. A second group or layer of biscuits is now fed upon the layer already in place, and these operations continue until the carton is full.

In order to protect the biscuits against injury the adjacent layers are separated by strips of paper which are inserted in place during the packing operation, and the machine includes mechanism for drawing the paper from a supply, severing suitable lengths of paper and placing one such length over each layer of biscuits as the latter is deposited on the biscuit receiving surface. The machine also includes means for properly positioning the biscuits in a layer and holding them in such position during the lowering of the receiving surface, and this means takes the form of cushioned pads which contact with the biscuits in a row deposited on the platform and hold these biscuits in proper position as the surface is lowered.

The mechanism for actuating the biscuit receiving surface or platform is arranged to lower the platform in a series of short steps, and then to raise the platform in a single long step. The cartons supplied to the machine for filling, are provided with bottom flaps which are turned inwardly, leaving an opening which is less than the cross section of the carton. The platform is accordingly constructed so that it may be collapsed so as to pass through the opening and then expanded to provide a surface of substantially the same area as the cross section of the carton, and the mechanism by which the platform is raised and lowered automatically expands and contracts the platform at the appropriate instant in its movement.

For a better understanding of the invention, reference will be made to the accompanying drawings, in which—

Figure 13 is a detail sectional view of the pawl means for preventing an incorrect upward movement of the plunger.

Figure 14 is a detail sectional view of a modified means for controlling the plunger operating pawl.

Figure 15 is a section taken at right-angles to the section of Figure 14, showing the pawl retracted.

Figure 16 is a similar view, showing the pawl in projected position.

Figure 17 is a view similar to Figure 5, with the platform fully raised and showing the vacuum pump connection.

The drawings illustrate a machine for packing shredded wheat biscuits in cartons holding a dozen biscuits arranged in layers of three each, and the machine is provided with duplicate parts so that two cartons may be packed at a time. Each carton packing mechanism packs cartons 28ª, having bottom openings 28ᵇ (Fig. 4) partially restricted by flaps 28ᶜ. The cartons are fed successively by means not shown to a position in which their openings 28ᵇ register with an opening 96 in the platform on which the cartons rest. Through this opening is moved a vertically reciprocating biscuit receiving surface or platform 28. Each carton has bottom flaps 28ᶜ which are turned inwardly to close a portion of the bottom opening, and the space between the flaps corresponds to the size of the opening in the carton-supporting platform. When the carton is in proper position, the platform 28 is raised into the carton through the bottom opening to a position level with the top of the carton and in alignment with a platform 26ª, from which the biscuits are moved by suitable devices upon the platform 28.

The platforms 28 of the two packing devices (Fig. 4) are mounted on a plunger frame 37 which is given a downward movement step by step, each step in the movement corresponding to the thickness of a layer of biscuits. Before each downward step, each platform 28 receives a layer of biscuits and when the downward step by step movement is completed, the platforms 28 are withdrawn through the openings in the bottom of the cartons, and the filled cartons are ejected from the carton receiving position and empty cartons substituted. After each step in the downward movement of the plunger frame, devices are operated to draw strips of paper from a supply, cut suitable lengths from the strips, and insert a strip of paper in each carton between adjacent lengths of biscuits, and these devices also operate to place a strip of paper on the surface of each platform before the first layer of biscuits is deposited thereon, this strip of paper serving to bridge the opening between the carton flaps when the carton is removed. As soon as the filled cartons have been removed and the empty cartons have been placed in position, the plunger frame is raised to the upper limit of its path of travel in a single step, and the filling devices being to operate in the manner to be described.

Figure 2:
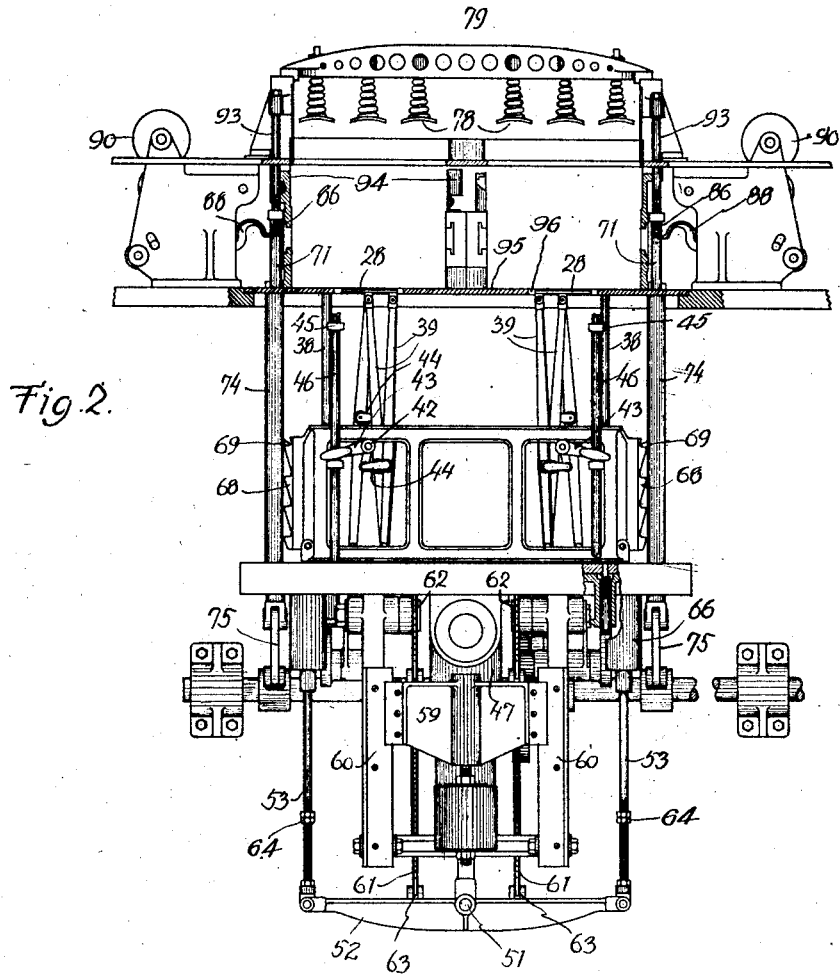
Figure 2 is a longitudinal vertical section of the same, with the plunger in fully lowered position.
Figure 4:
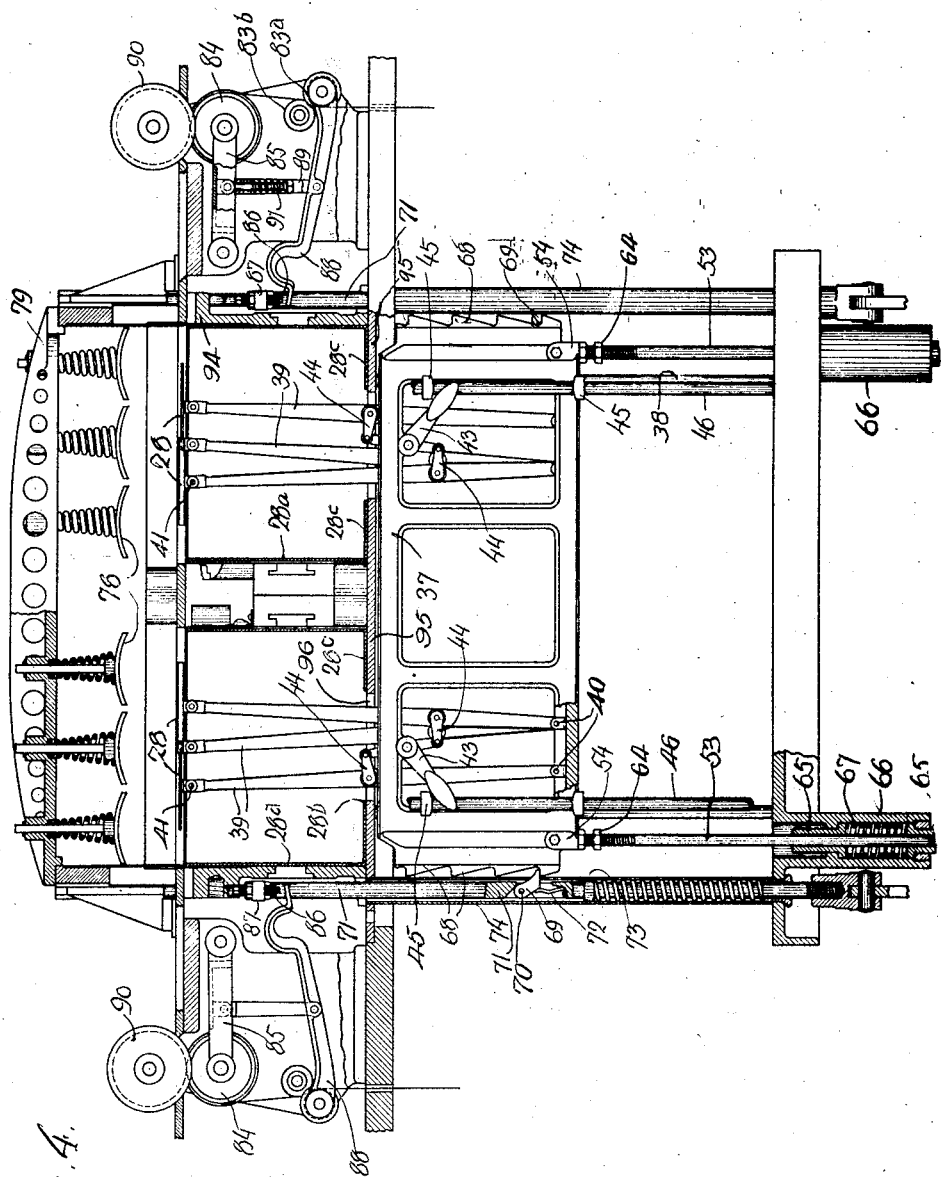
Figure 4 is a view similar to Figure 2, with the plunger in fully raised position, showing the carton, parts being removed and parts being broken away and sectioned.
Figure 5:
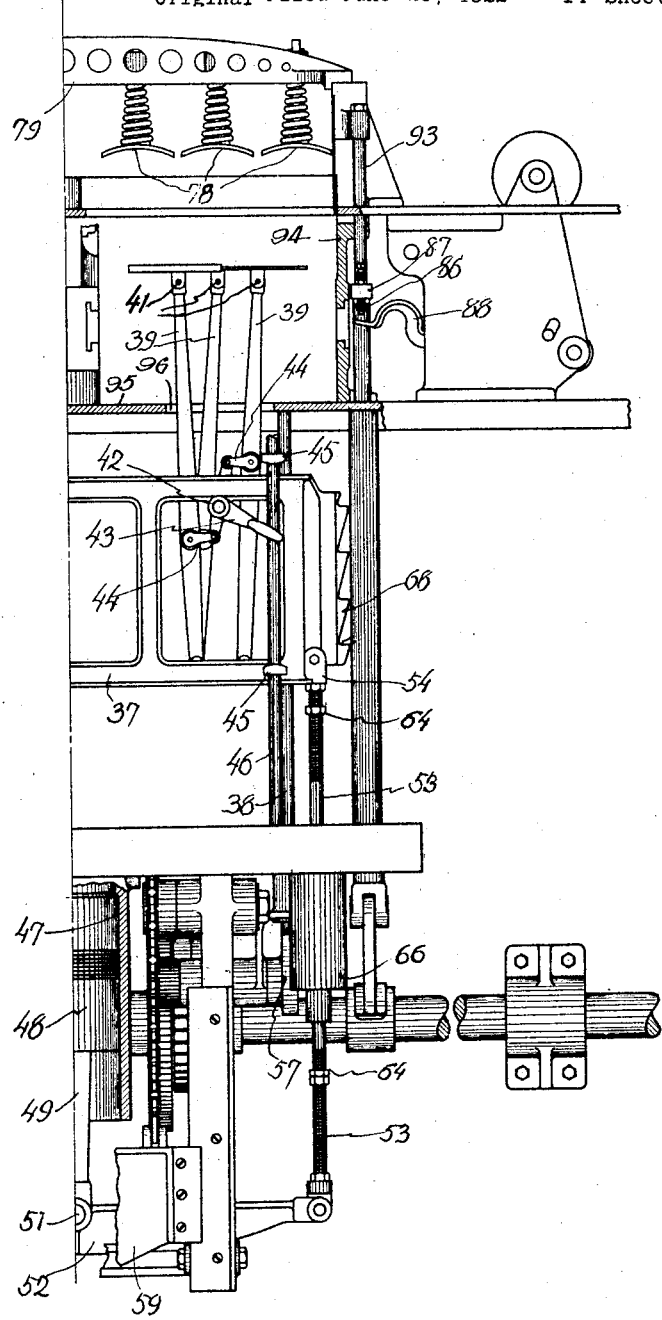
Figure 5 is a view similar to Figure 2, with the plunger lowered one step, parts being broken away, and showing the counterweight for the plunger, etc.
Figure 6:
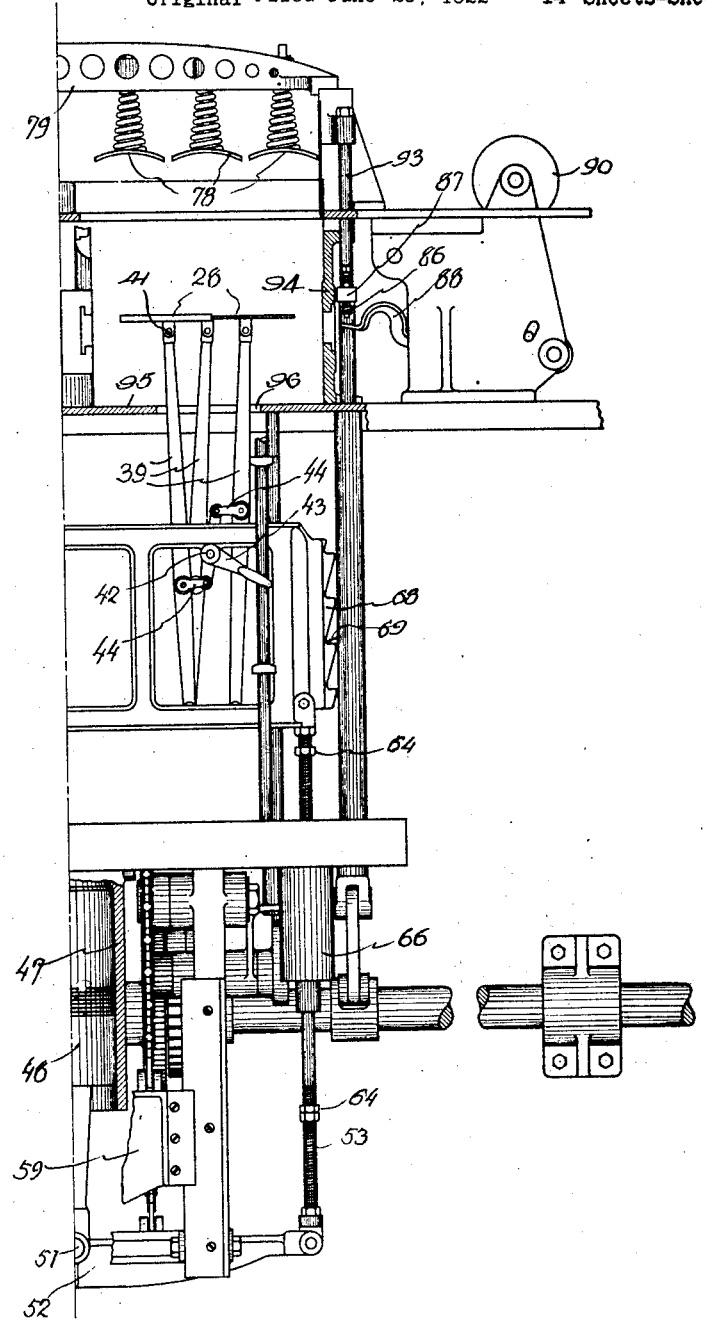
Figure 6 is a view similar to Figure 5, with the plunger lowered a second step.
Figure 7:
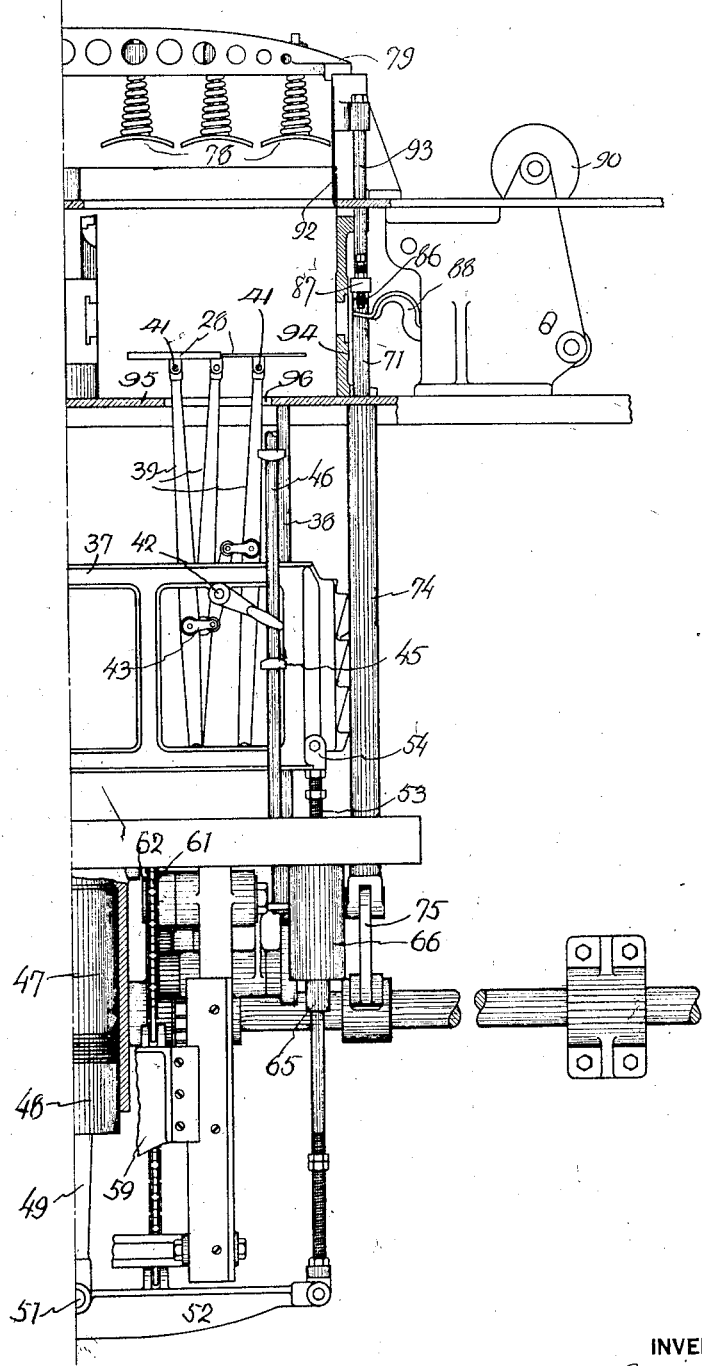
Figure 7 is a similar view with the plunger lowered a third step.
Figure 8:
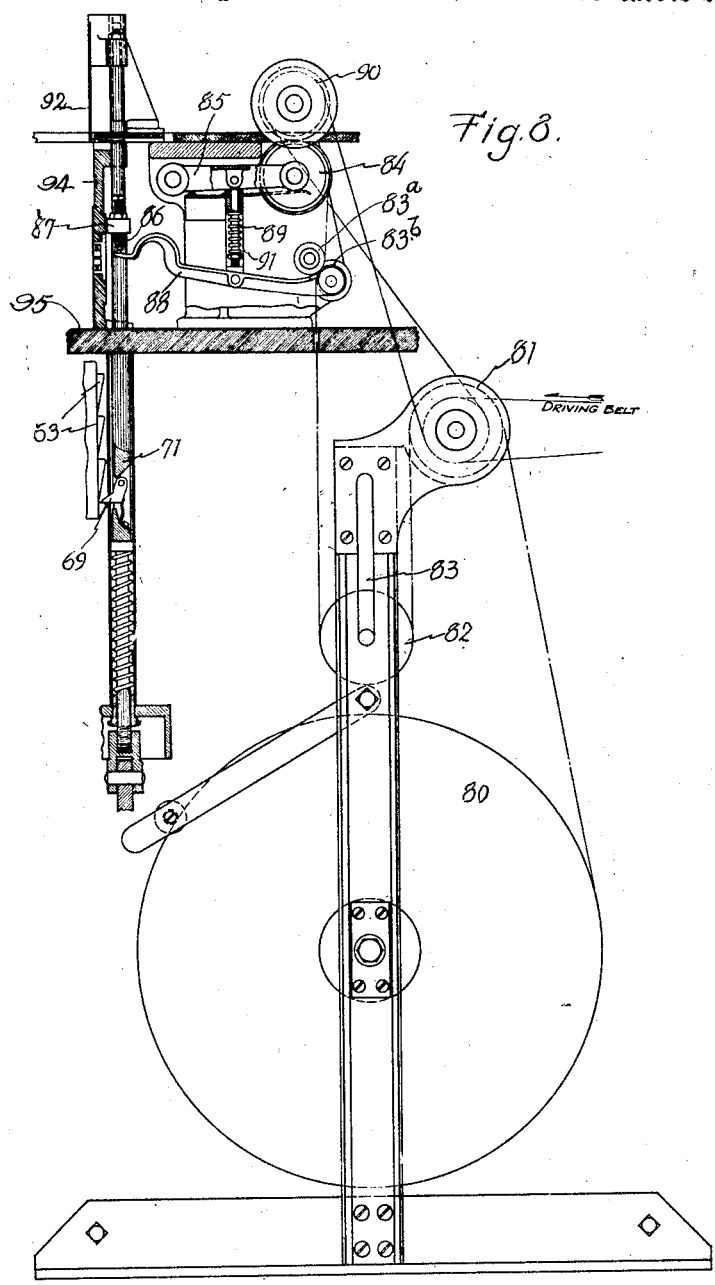
Figure 8 is a detail longitudinal sectional view showing the insert paper feeder and cutter.
Figure 9:
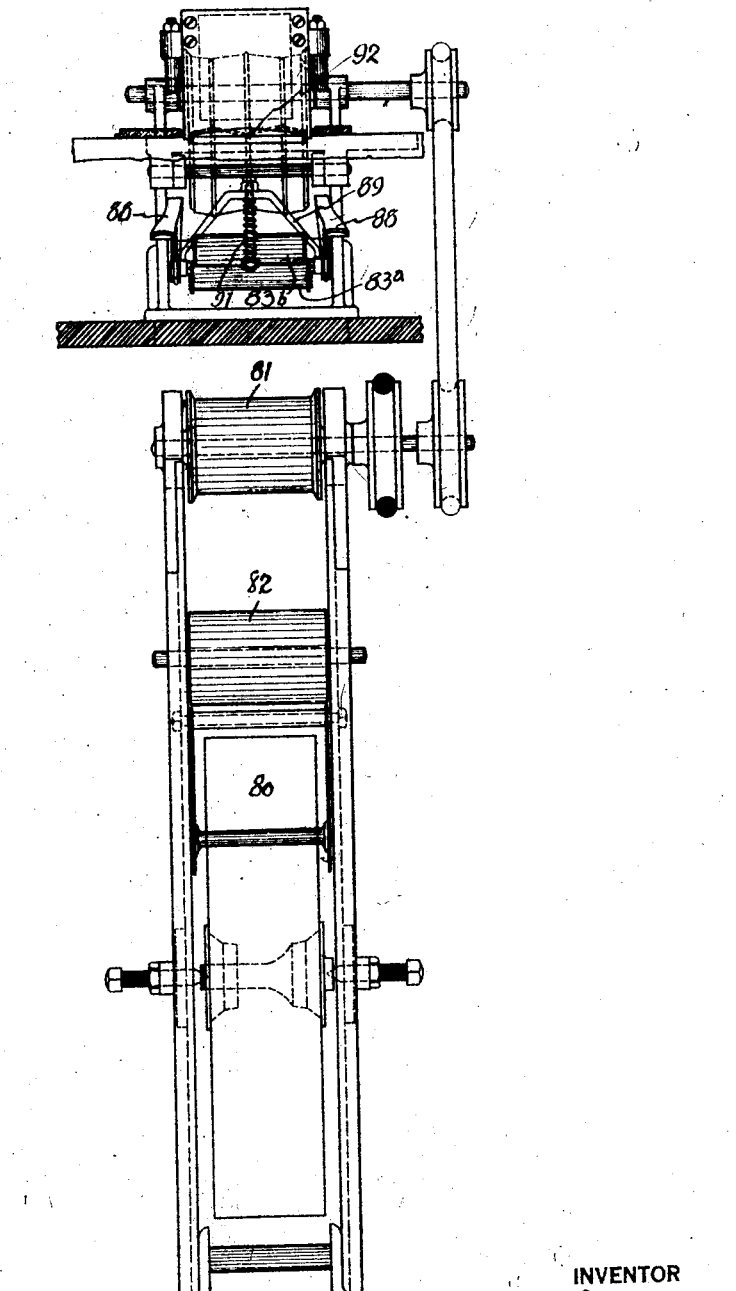
Figure 9 is a detail end view, partly in section, of the insert paper feeder and cutter.
Figure 10:
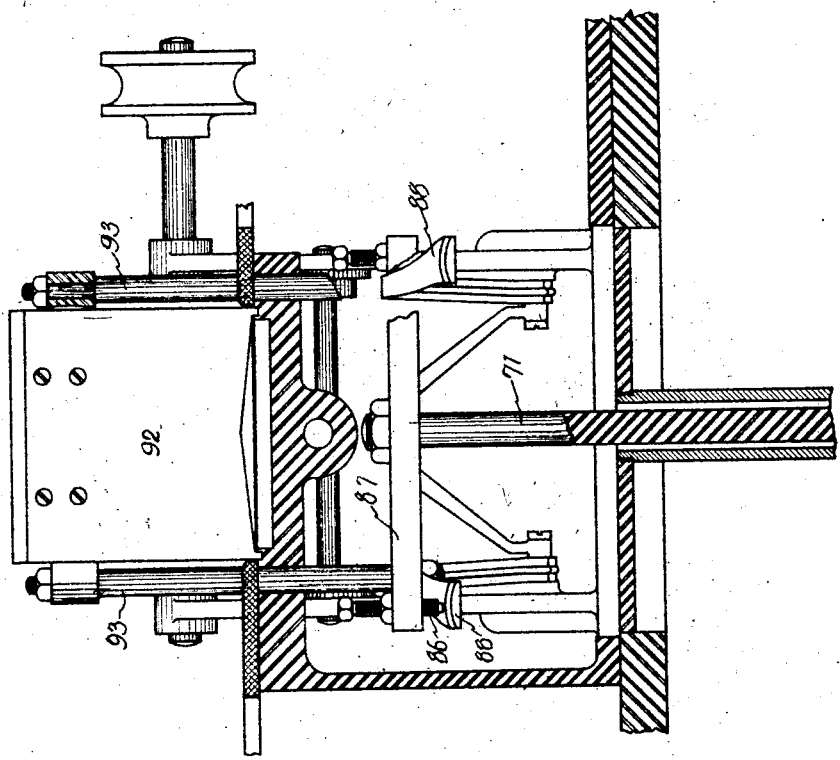
Figure 10 is a detail transverse section of the insert paper feeder and cutter.
Figure 11:
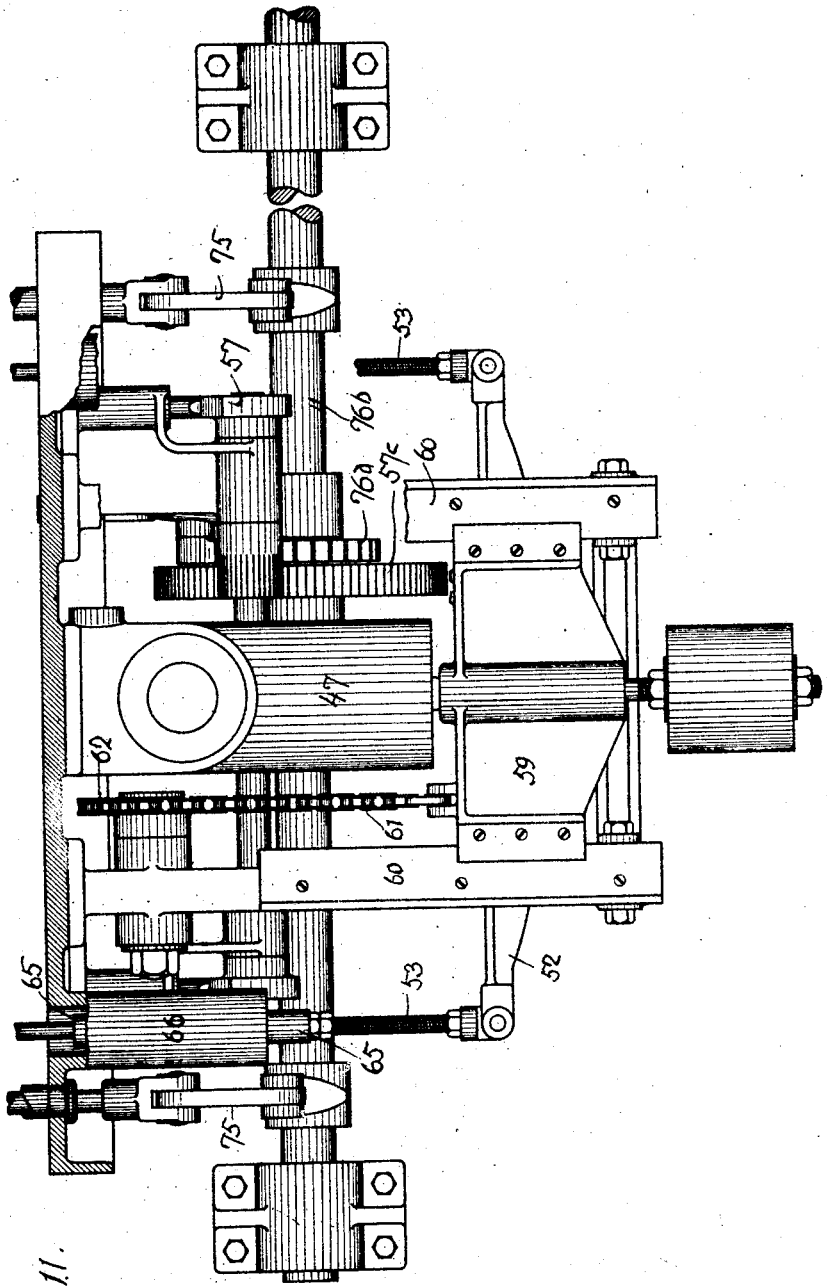
Figure 11 is a detail side view of the counterweight for the plunger, etc.
Figure 12:
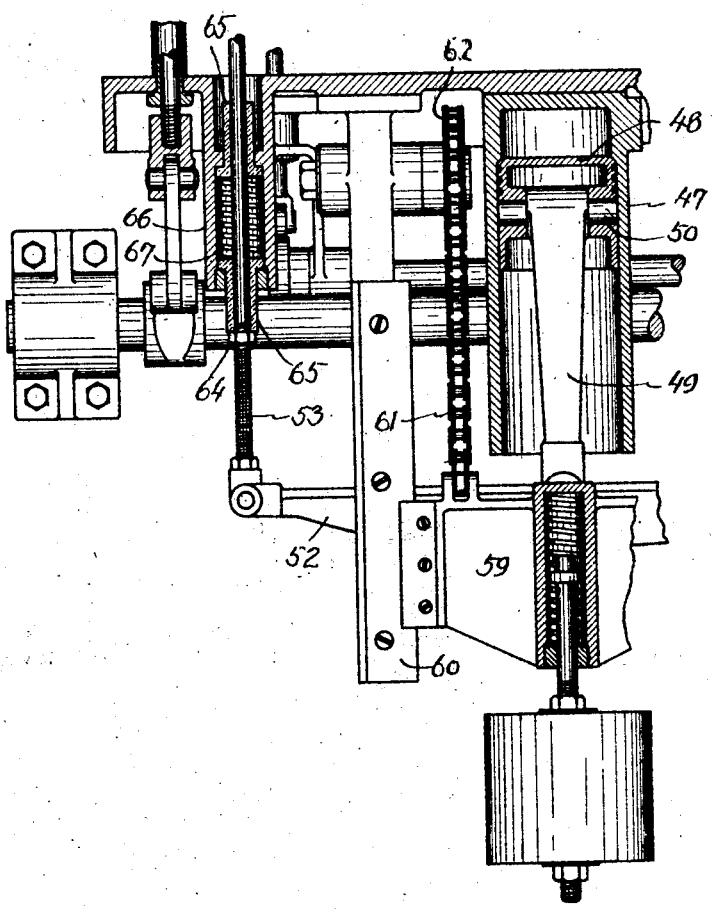
Figure 12 is a detail sectional view of the same.

The plunger of the packing mechanism includes a vertically reciprocating frame 37, which is slidable upon vertical rods 38 (Fig. 4). Extending upwardly from each end of the frame are rods 39, pivoted to the frame at their lower ends at 40. There are three such rods 39 at each end of the frame 37, and the upper ends of the rods are pivoted at 41 to the two sections of a platform 28. Two of the rods are used for moving the sections of the platform apart, and the third rod serves to keep the platform from tilting as the two sections are moved together or apart. In the lower position of the plunger (Fig. 2), the rods are close together to contract the platform, and when the platform is in its uppermost position (Fig. 4), the rods are spread apart to expand the platform. In the expanded condition, the surface of the platform is substantially equal to the cross-section of the carton. The platform remains in expanded condition during the first three steps in the downward movement of the frame, but in the last downward step in the movement of the frame, following the placing of the topmost layer of biscuits on the platform, the platform is contracted and passes through the opening in the platform on which the carton is supported.

The platform 28 of the plunger is in this way adapted in the initial upward movement of the plunger and in the final downward movement of the plunger, to pass through the bottom opening 28ᵇ of the carton, which is of less area than that of a horizontal cross-section of the carton chamber, whereas the expansion of the platform 28 as stated is for the purpose of making said platform approximately of the same area as that of a horizontal cross-section of the carton chamber.

The said movement of the rods 39 and of the platform is accomplished by means of a transverse shaft 42 (Fig. 2), mounted in the frame 37, and whereon are pivotally mounted rock levers 43, having link connections 44 with the two outer of the upstanding rods. The rock levers 43 engage stops 45 on rods 46 near the end of the upward and downward movements of the plunger and the rock levers are thereby tilted to rock the shaft 42 to cause a movement of the rods 39, resulting in the expansion or contraction of the platform.

Figure 1:
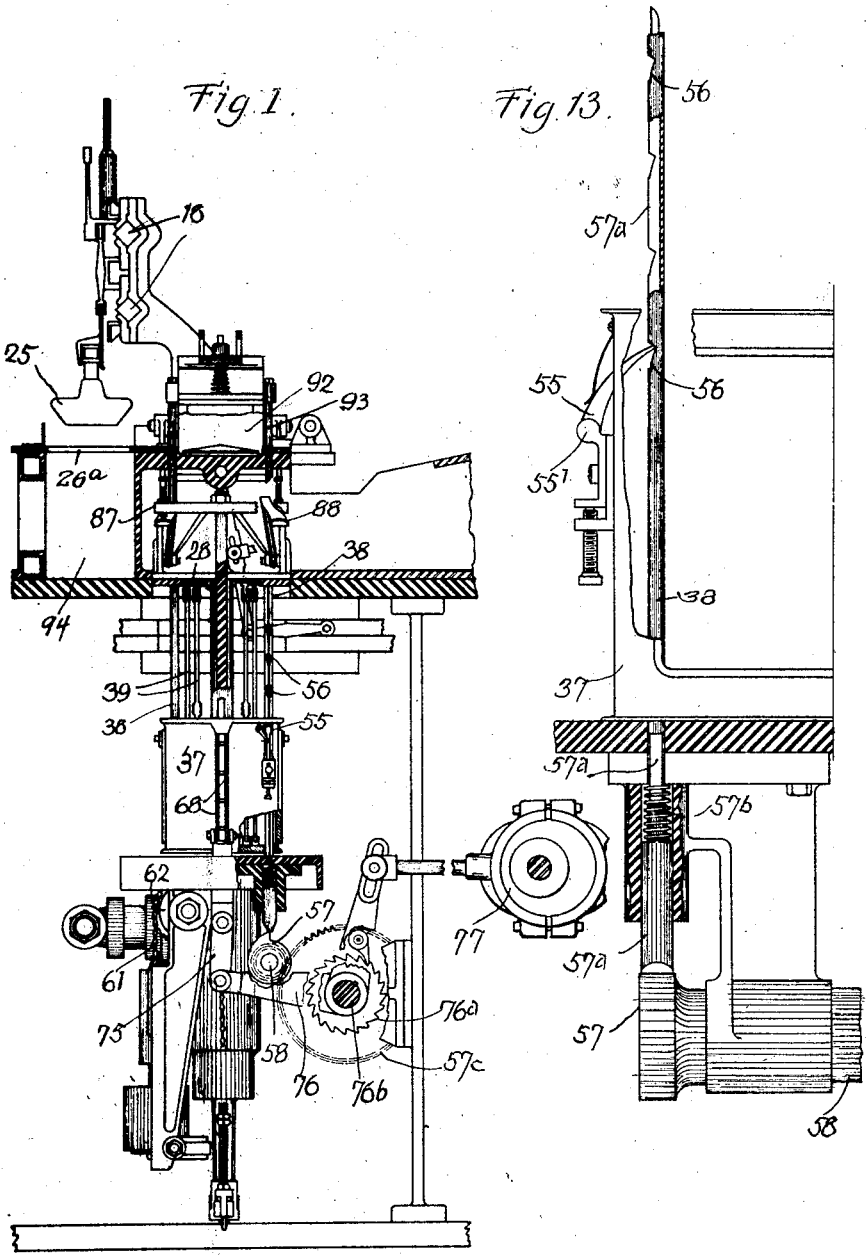
Figure 1 is a transverse vertical section of the packing machine, with the plunger in fully lowered position.
Figure 3:
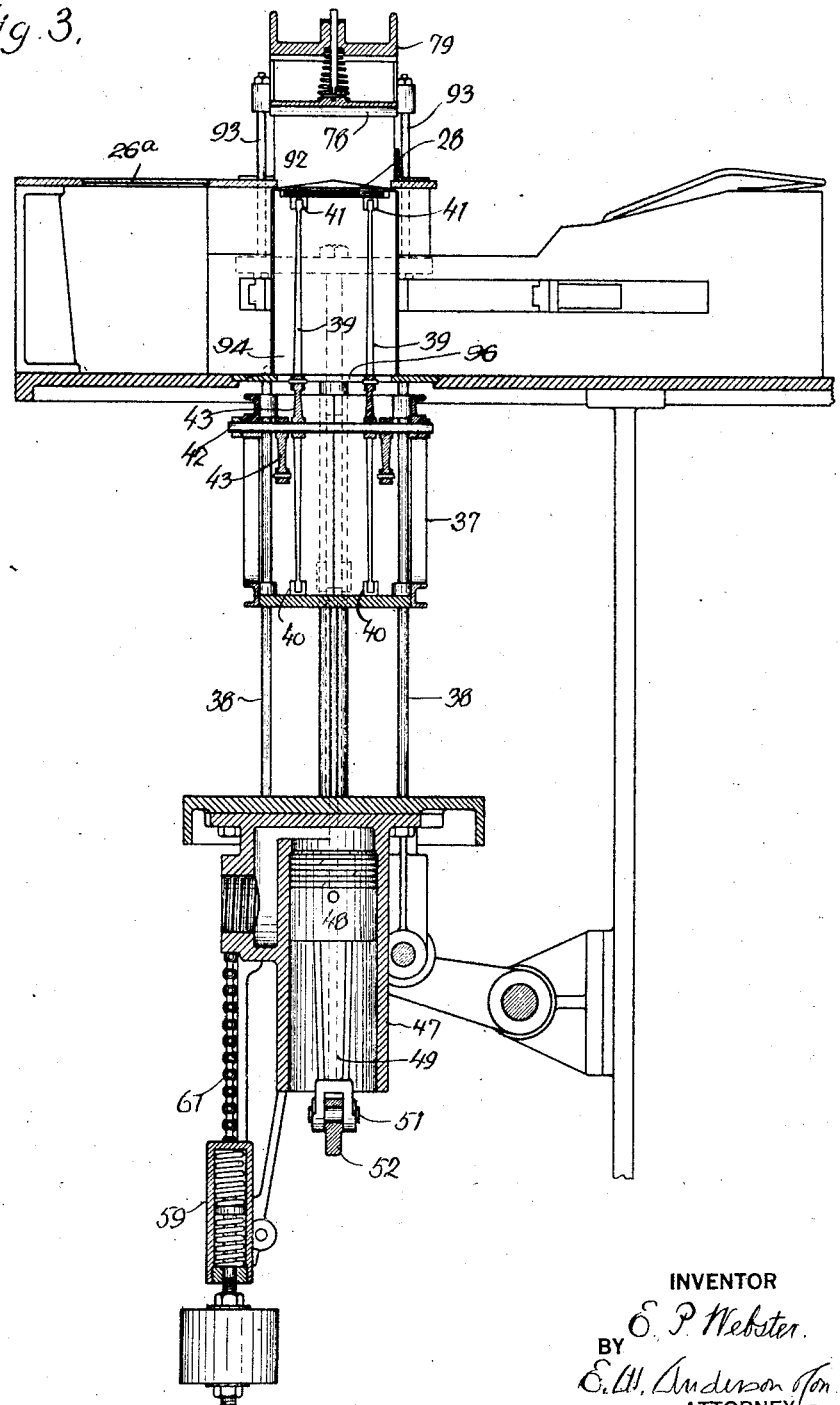
Figure 3 is a view similar to Figure 1, with the section taken on a different line and the plunger in fully raised position and parts being removed.

The upward movement of the plunger one full stroke to uppermost position is accomplished by the action of a more or less complete vacuum in a cylinder 47 (Figs. 2, 3), exerting an upward pull upon the piston head 48 working in said cylinder, said head having a piston rod 49 pivotally connected thereto at 50, and the lower end of which is pivotally connected at 51 to a cross-head 52, the latter having at its outer ends vertical rods 53, having at their upper ends connection with the plunger frame 37 at 54. The plunger is prevented from being moved upwardly except at the proper times by spring-pressed pawls 55 (Fig. 13), pivoted to the plunger frame 37 at 55' and engaging the respective teeth 56 of the vertical rods 38 aforesaid. Such pawls are automatically released to enable the plunger to be moved upwardly one full stroke as stated at the proper times by means of cams 57 upon shaft 58, said cams engaging the lower ends of reciprocatory steel strips 57$^a$, having notches normally in register with the notches between the teeth 56, whereby in the upward movement of the strips the pawls are released as stated. The strips are returned to normal position by springs 57$^b$. In order to properly time the action of the cams 57 which engage the steel strips 57$^a$ and accomplish the automatic release of the pawls 55, to enable the plunger 28 to move upwardly one full stroke as stated, these cams have gearing connection 57$^c$ (Fig. 1) with ratchet wheel 76$^a$, loose upon shaft 76$^b$ of the rock lever 76. The vacuum cylinder 47 is provided with a vacuum pump connection 168 whereby a sufficient vacuum is maintained therein at all times to exert a constant pull upwardly upon the piston head 48.

The plunger is provided with a counter-weight 59 (Fig. 2), engaging guides 60 and suspended from chains 61, the latter passing upwardly around pulleys 62 and downwardly to and having connection with cross-head 51 at 63. At the end of the upward movement of the plunger one full stroke, as stated, and in the final downward movement of the plunger, nuts 64 of the rods 53 will engage one or the other of plugs 65, working in a seat 66, and thereby compress a coiled spring 67, located in said seat, to absorb the shock (Fig. 4).

For the purpose of accomplishing the step by step downward movement of the plunger 28, the frame 37 is provided at each side thereof with a lateral series of four teeth, constituting a rack 68, the respective teeth of which are engaged by a pawl 69, pivoted on 70 to a reciprocatory vertical rod 71, a spring 72 serving to hold said pawl normally projected and engaged with said rack as stated, through a lateral slot 73 of a vertical sleeve 74, wherein said rod 71 works. This rod is given a vertically reciprocatory movement by means of a link connection 75 with a rock lever 76 (Fig. 1) operated by an eccentric 77, the pawl 69 at the end of the upward movement of rod 71 engaging the upper wall of slot 73 of sleeve 74 and being retracted within said sleeve. This retraction of the pawl within the sleeve is without function except to allow the rise of the plunger 28 one full stroke as stated.

After the frame 37 has reached its uppermost position, and is held there by the engagement of the pawls 55 with the uppermost teeth 56 of the rods 38, both rods 71 are moved downwardly at the proper instant a distance equal to the length of one tooth 68, and the pawls 69 engaging these teeth, move the frame downwardly a single step. The pawls 55 move downwardly with the frame and at the end of the downward step the pawls engage the teeth 56 next in order so as to hold the plunger in the new position. The rods 71 are now moved upwardly and the pawls 69 engage the teeth of the rack 68, next to the lowest teeth of the rack. Upon the succeeding operations of the rod 71, the plunger is moved downwardly step by step as described.

During the reciprocatory movement of the rods 71, spring cushioned pads 78, carried by an upper cross-head 79, the latter mounted upon posts 93 carried by cross-head 87 and thereby connecting the rods 71, will be let down upon the biscuit layer previously fed to the carton, and will assure the downward movement of said layer in the carton in proper horizontal position and in unison with the downward movement of the plunger.

The insertion of the paper strips in the cartons is brought about by mechanism duplicated for each carton. Only a single such mechanism will therefore be described. The paper in the form of a supply roll 80, is led therefrom upwardly around a driven roll 81, thence downwardly around a roll 82, which is vertically movable in slotted bearings 83, so that it maintains the paper taut at all times. The paper is led upwardly from the roll 80, through brake rolls 83$^a$, 83$^b$; thence between an idler roll 84 and a driven roll 90, and thence horizontally over the plunger platform 28. The roll 84 is carried in the ends of pivoted arms 85, and these arms are operated in the downward movement of the rods 71 by engagement of screws 86 of cross-heads 87 of said rods with the free ends of levers 88, the latter having link connections 89 with said arms through spring 91 and thereby moving roll 84 away from its drive roll 90 and at the same time tensioning the spring 91. In the upward movement of the rods 71 the spring 91 will return the roll 84 to raised position, into contact with its drive roll 90, and during the time that this contact is maintained, insert paper will be fed horizontally over the plunger platform 28. The downward movement of the plunger 28 now taking place, said contact of rollers 84 and 90 is broken and the feeding of insert paper is stopped, the brake rolls 83ª and 83ᵇ acting to prevent the return movement of the paper. The paper so fed over the plunger platform is severed in suitable lengths by knife 92 carried at the upper ends of the rods 71 by posts 93 and cross head 87.

The cartons are fed to each packing mechanism by suitable devices which feed the cartons one after another in a guide-way 94, with which they contact at the sides and bottom. The side flaps at the bottom of the cartons are folded against the outer surface of the cartons, and the end flaps 28ᶜ at the bottom of the cartons are turned inwardly so as to rest upon flanges 95 at the bottom of the guide-way. In the guide-way is an opening 96 between the end flanges, through which the plunger platform 28 is introduced into the cartons. The feeding mechanism is in duplicate so that cartons are fed in pairs to the platforms 28, the cartons being held in position by the walls of the guide-way so that by suitable longitudinal movement the cartons may be placed in proper registry with the platforms 28. As the cartons are filled, they are advanced along the guide-way clear of the platforms 28 and empty cartons are then placed in position.

In Figs. 14, 15, and 16 of the drawings, there is shown a modification of the mechanism by which the plunger frame 37 is moved downwardly with a step by step movement. In this form, each rod 71 which carries a pawl 69 brought into engagement with the teeth of the rack 68 on the plunger frame, also carries a ferrule or thimble 96 which slides upon the rod 71 and is placed between the rod and the sleeve 74. The rod 71 carries upper and lower stop pins 98, placed on either side of the pawl 69 and the sleeve 74 is provided with flat springs 97 which project through openings in the sleeve and bear against the surface of the ferrule 96. When the rod 71 is moved upwardly, the ferrule 96 is held against movement by the springs 97 and the pawl 69 rides into the end of the ferrule and is retracted within the sleeve 74. In the continuation of the movement of the rod 71, the lower stop pin 98 strikes the lower end of the ferrule, whereupon the ferrule is moved with the rod. In the downward movement of the rod 71, the ferrule is again held against movement by the springs 97 and the rod 71 carries the pawl 69 out beyond the lower end of the ferrule. The ferrule remains stationary until the upper stop pin 98 on the rod 71 strikes the ferrule, whereupon the ferrule is moved with the rod against the action of the springs 97, and thereafter the upper pin 98 will engage the thimble, and the thimble and the pawl will move downwardly in unison for the full stroke downwardly of said rod; and upon the upstroke of said rod, the pawl 69 will be substantially instantly retracted against the tension of its spring, owing to reengagement with said thimble, and thereafter the lower pin 98 will contact with the thimble, and the thimble and the pawl will move in unison for the full stroke upwardly of said rod.

I claim:—

1. In a machine for packing biscuit in cartons, a biscuit support adapted to work within the cartons, means for moving the same step by step vertically, and follow-up means for the biscuit also adapted to work within the cartons.

2. In a machine for packing biscuit in cartons, a biscuit support adapted to work within the cartons, means for moving the same step by step vertically, and cushioned follow-up means for the biscuit also adapted to work within the cartons and having means for intermittently moving the same vertically in unison with the biscuit support.

3. In a machine for packing biscuit in cartons, a biscuit support adapted to work within the cartons, means for moving the same a plurality of part strokes downwardly, and means for moving the same a full stroke upwardly including a cylinder, a piston working therein and having an operating connection with the biscuit support, and means for maintaining a constant vacuum in said cylinder.

4. In a machine for packing biscuit in cartons, a biscuit support adapted to work within the cartons, means for moving the same step by step downwardly including a rack device, and reciprocatory means having a pawl adapted to engage the teeth of said rack device, and means for moving the biscuit support a full stroke upwardly including a cylinder and a piston working therein and having an operating connection with the biscuit support, means for maintaining a constant vacuum in said cylinder, and means for preventing upward movement of the biscuit support at other than the proper times.

5. In a machine for packing biscuit in cartons, a biscuit support adapted to work within the cartons, means for automatically moving the same step by step vertically downward including a rack device, reciprocatory means including a pawl engaging said rack device and adapted to cause said pawl to project at the beginning of each downward movement and to retract at the beginning of each upward movement.

6. In a machine for packing biscuit in cartons, a biscuit support adapted to work within the cartons, means for automatically moving the same step by step vertically downward including a rack device, reciprocatory means including a pawl engaging said rack device and adapted to cause said pawl to project at the beginning of each downward movement and to retract at the beginning of each upward movement, means for moving the biscuit support a full stroke upwardly during a retraction of said pawl and means for preventing upward movement of the support at other than the proper times.

7. In a machine for packing biscuit in cartons, a vertically reciprocatory biscuit support adapted to work within the cartons, a counterbalance weight therefor, and means for moving the support step by step downward and a full stroke upwardly.

8. In a machine for packing biscuit in cartons, a vertically reciprocatory biscuit support adapted to work within the cartons, a counterbalance weight therefor, means for moving the support step by step downward and a full stroke upwardly, and means for preventing upward movement of the biscuit support at other than the proper times.

9. In a machine for packing biscuit in cartons, a vertically reciprocatory biscuit support adapted to work within the cartons, a counterbalance weight therefor, and means for moving the support step by step downward and a full stroke upwardly, including a pawl and rack device and a vacuum cylinder.

10. In a machine for packing biscuit in cartons, a vertically reciprocatory biscuit support adapted to work within the cartons, a counterbalance weight therefor, means for moving the support step by step downward, and means for moving the support a full stroke upwardly, including a vacuum cylinder and a piston working therein and having connection with said counterbalance weight.

11. In a machine for packing biscuit in cartons, biscuit supporting and lowering means adapted to work within the cartons, means for intermittently operating the biscuit supporting and lowering means, and follow up means for the biscuit also working within the cartons.

12. In a machine for packing biscuit in cartons, biscuit supporting and lowering means adapted to work within the cartons, means for intermittently operating the biscuit supporting and lowering means, and cushioned follow-up means for the biscuit also adapted to work within the cartons and intermittently operating in unison with the biscuit supporting and lowering means.

13. In a machine for packing biscuits in cartons, the combination of a biscuit support movable within the cartons and receiving superimposed groups of biscuits, and devices operable within the cartons to contact with each biscuit in a group received by the support to position each biscuit in the group.

14. In a machine for packing biscuits in cartons, the combination of a support for a carton, a biscuit support movable into the carton and adapted to receive superimposed rows of biscuits, means for moving the biscuit support in a single step to the top of the carton and for lowering the support to the bottom of the carton in a succession of steps, and devices arranged to contact with each of the biscuits received by the support to position the biscuits in the rows.

15. In a machine for packing biscuits in cartons, a biscuit support adapted to work within the cartons, means for moving the support step by step vertically, means for supplying lengths of paper and laying them over the support, this means including a continuously operating feed roller, and means operative to render the roller ineffective to supply paper at predetermined intervals in the vertical movement of the biscuit support.

16. In a machine for packing biscuits in cartons, the combination of a support for a carton, a biscuit support reciprocable within the carton and arranged to receive superimposed layers of biscuits, and automatic means for moving the biscuit support, including a suction device tending to maintain the support continuously at one end of its path of travel and means operable to move the support with a step by step movement against the action of the said device.

17. In a machine for packing biscuits in cartons, the combination of a support for a carton, a biscuit support reciprocable within the carton and arranged to receive superimposed layers of biscuits, and automatic means for moving the biscuit support in a single step in one direction and with a step by step movement in the other direction, the said means including a rack carried by the support and a pawl arranged to engage the teeth of the rack successively.

18. In a machine for packing biscuits, the combination of supports for a pair of cartons, a frame movable vertically toward and away from these supports, and a pair of biscuit supporting platforms on the frame movable into and out of the cartons as the frame moves.

19. In a machine for packing biscuits, the combination of supports for a pair of cartons, a frame beneath the supports, movable vertically toward and away from the cartons, a pair of biscuit supporting platforms mounted on the frame and movable into and out of the cartons as the frame moves, the platforms being capable of expansion and contraction, and means operable to expand the platforms near one end of their path of travel and to contract them near the other.

20. In a machine for packing biscuits, the combination of a support for a carton, a frame beneath the support movable toward and away from the carton, a platform for receiving biscuits and lowering them into the carton comprising a pair of plates mounted on the frame and means for moving the plates together and apart.

21. In combination, a carton filling mechanism comprising a platform, supporting means for the platform, means for lowering the supporting means step by step, and suction means operable, upon lowering of the platform to its lowermost position, to return it to its raised position.

22. In a carton filling mechanism, the combination of a platform, a support for the platform adapted to be moved vertically, means tending to move the support to its uppermost position at all times, means for lowering the support with a step by step movement, releasable means operating to retain the support at each step of its step by step movement, and means for releasing the means last mentioned as the support reaches its lowermost position to permit the support to return to its uppermost position.

In testimony whereof I affix my signature.

EARL P. WEBSTER.